United States Patent [19]

Chai

[11] Patent Number: 5,690,022

[45] Date of Patent: Nov. 25, 1997

[54] PEELING DEVICE

[76] Inventor: Liao-chu Chai, No. 2, Taming Lane, Hsinkuang Rd., Taiping City, Taichung Hsien, Taiwan

[21] Appl. No.: 764,149

[22] Filed: Dec. 11, 1996

[51] Int. Cl.⁶ .................. A23N 7/00; A47J 17/04; A47J 43/28

[52] U.S. Cl. .................. 99/590; 99/541; 99/594; 99/595; 99/599

[58] Field of Search .................. 99/537–541, 584, 99/588–594, 567, 595–599; 426/482, 483

[56] References Cited

U.S. PATENT DOCUMENTS

| | | | |
|---|---|---|---|
| 3,211,202 | 10/1965 | Mason | 99/595 X |
| 3,881,406 | 5/1975 | Perez | 99/594 |
| 3,982,482 | 9/1976 | Webb et al. | 99/491 |
| 4,350,088 | 9/1982 | Rubio, Jr. | 99/538 |
| 4,581,990 | 4/1986 | Matsumoto | 99/538 |
| 4,753,159 | 6/1988 | Eaton | 99/567 |
| 4,765,234 | 8/1988 | Cailliot | 99/593 |
| 5,097,758 | 3/1992 | Fresh | 99/590 |
| 5,105,735 | 4/1992 | Gonzalvo | 99/590 |
| 5,558,011 | 9/1996 | Heim | 99/595 |

*Primary Examiner*—Timothy F. Simone
*Attorney, Agent, or Firm*—Kolisch, Hartwell, Dickinson, McCormack & Heuser

[57] ABSTRACT

A peeling device includes a base in which a motor is disposed and two ends portions extend from the base wherein a transmitting device is disposed in one of the end portions and is actuated by the motor, a first lead screw rotatably supported between the two end portions and driven by the transmitting device, a movable member movably and threadedly engaged with the first lead screw and a knife disposed to the movable member, a first fork member extending from one of the end portions and mechanically connected to the transmitting device and a second fork member adjustably disposed to the other end portion such that an object to be peeled by the knife is securely positioned between the first and second fork members.

6 Claims, 4 Drawing Sheets

1

PEELING DEVICE

BACKGROUND OF THE INVENTION

1. Field of the Invention

The present invention relates to a peeling device and, more particularly, to a peeling device having a peeling knife movably disposed on a first lead screw driven by a motor and two fork members rotatably disposed above the first lead screw such that an object positioned between the two fork members is peeled by the movable knife.

2. Brief Description of the Prior Art

Peeling devices are used to peel spherical vegetables and fruit, such as an apple. The peeling device generally is operated by a motor which drives a fork member extending laterally from an end wall of the peeling device to rotate and the apple is fixedly disposed on the fork member and a knife is disposed beside the fork member and contacts the apple such that the apple is peeled by the knife. However, such a peeling device has the following shortcomings:

(1) Because the fork member extends laterally from the peeling device and a sharp end of the fork member is exposed to users, the user could be hurt when putting the apple on the fork member and the fork member could even hurt people not using the device.

(2) The object to be peeled could drop from the fork member because there is only one fork member.

(3) The peeling device cannot be used to peel an oblong object such as a summer squash, because the fork member can only penetrate one end of the summer squash and thus the fork cannot support the entrie length of the squash.

The present invention intends to provide an improved peeling device having two fork members and a knife movably disposed on a first lead screw driven by a motor such that an object to be peeled can be fixedly and rotatably disposed between the two fork members so as to be peeled by the movable knife such that the above-mentioned problems can be mitigated and/or obviated.

SUMMARY OF THE INVENTION

The present invention provides a peeling device which comprises a base having a top plate and a bottom plate between which a motor is disposed, a first hole being defined in the top plate near a first end of the base. The top plate has a first end portion disposed to a first end thereof and the first hole communicates with an interior of the first end portion in which a transmitting means is disposed so as to mechanically connect to the motor via the first hole. The top plate has a second end portion disposed to a second end thereof opposite to the first end portion.

A first lead screw is rotatably supported between the first end portion and the second end portion, one end of the first lead screw securely connected to the transmitting means.

A movable member is movably engaged with the first lead screw and a knife is pivotally connected to the movable member. A first fork member has one end thereof fixedly connected to the transmitting means and the other end thereof has a plurality of first spikes extending longitudinally therefrom. A second fork member movably extends from the second end portion with a plurality of second spikes extending from the second fork member facing to the first spikes.

It is an object of the present invention to provide a peeling device having a knife movably disposed on a lead screw and two fork members disposed above the lead screw so that an object is rotatably and securely positioned between the two fork members and is peeled by the knife.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
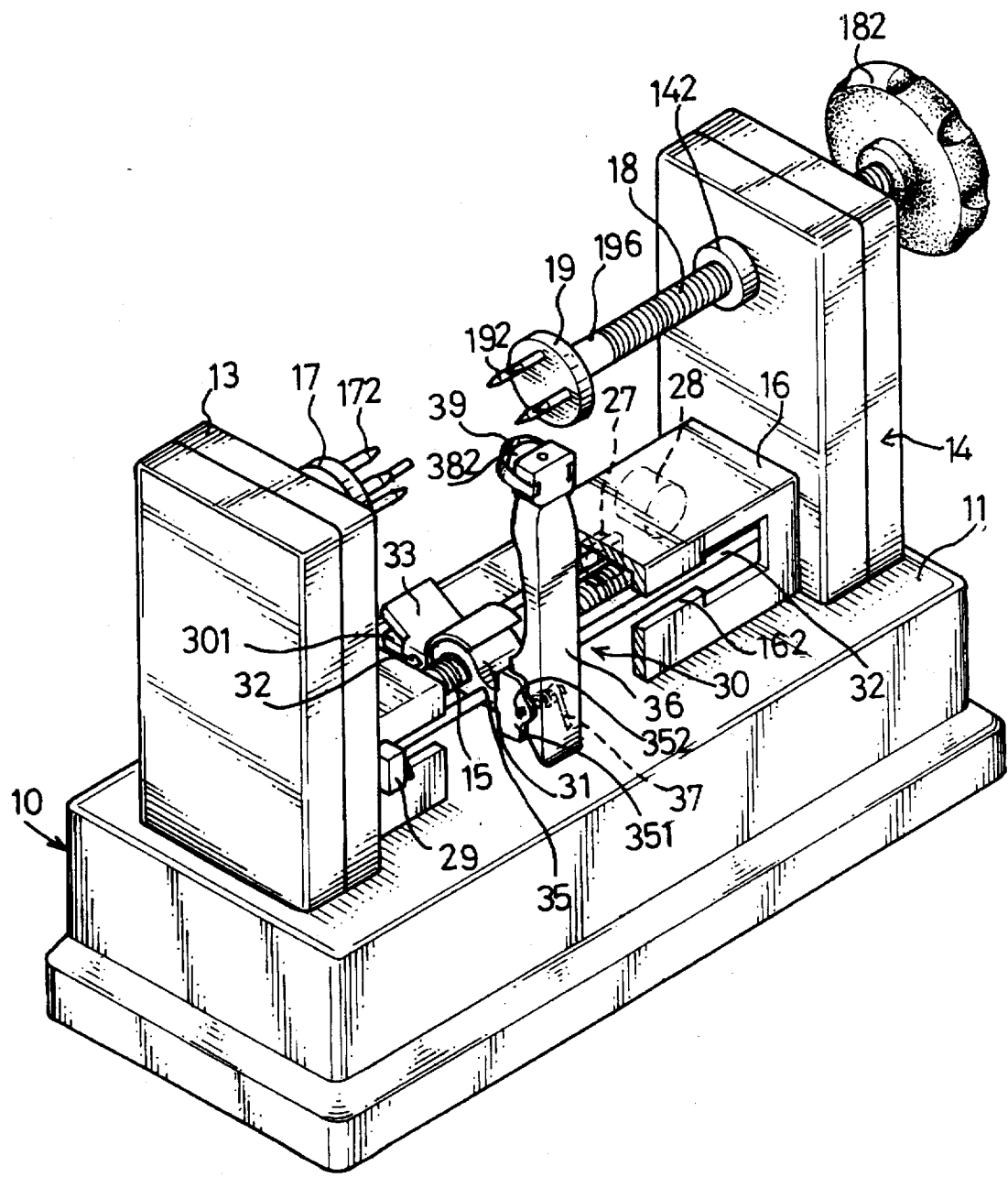
FIG. 1 is a perspective view of a peeling device in accordance with the present invention.
Figure 2:
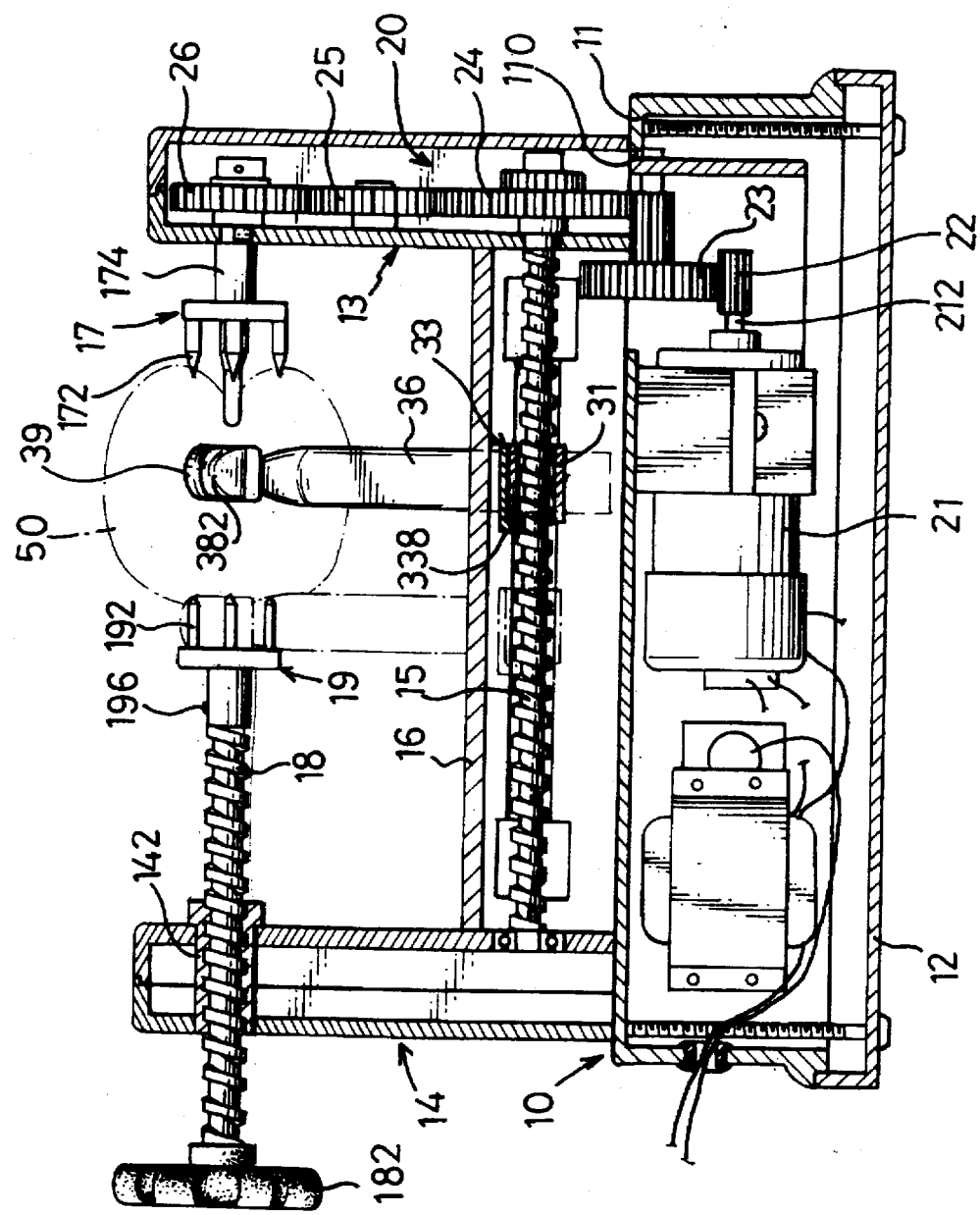
FIG. 2 is a side elevational view, partly in section, of the peeling device with an object (shown in phantom lines) positioned between the two fork members.

Referring to the drawings and initially to FIGS. 1 and 2, a peeling device in accordance with the present invention generally includes a base 10 having a top plate 11 and a bottom plate 12, a first hole 110 defined in the top plate near a first end of the base 10. A motor 21 is disposed in the base 10 and located between the top plate 11 and the bottom plate 12.

The top plate 11 has a first end portion 13 disposed to a first end thereof and the first hole 110 communicates with an interior of the first end portion 13. The top plate 11 has a second end portion 14 disposed to a second end thereof and is located opposite to the first end portion 13. The second end portion 14 has a tubular member 142 transversely disposed therethrough which has an inner threaded portion defined therein.

A transmitting means 20 is disposed in the first end portion 13. The motor 21 has a shaft 212 rotatably extending therefrom and has a pinion 22 connected thereto so as to engage with a first gear 23. The first gear 23 engages with a second gear 24 which engages with a medium gear 25 and the medium gear 25 engages with a third gear 26.

A first lead screw 15 is rotatably supported between the first end portion 13 and the second end portion 14. One end of the first lead screw 15 is securely connected to the second gear 24 of the transmitting means 20 and the other end of the lead screw 15 is rotatably disposed to the second end portion 14 by a bearing.

A movable member 31 is movably engaged with the first lead screw 15 and a knife 30 is pivotally connected to the movable member 31.

Figure 3:
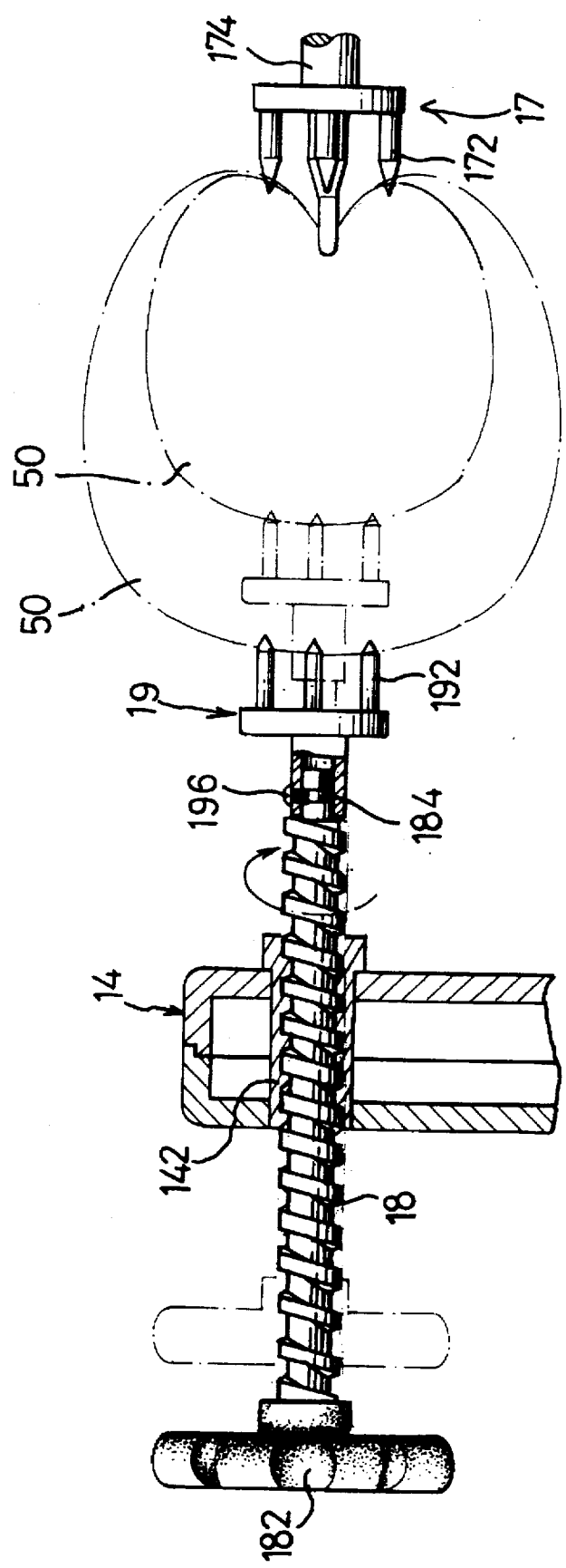
FIG. 3 is an illustrative and elevational view, partly in section, of the two fork members and the object (shown in phantom lines)

A first fork member 17 has a stem 174 formed to one end thereof which is fixedly connected to the third gear 26 of the transmitting means 20 and the other end of the first fork member 17 has a plurality of first spikes 172 extending longitudinally therefrom. Further referring to FIG. 3, a second lead screw 18 is threadedly engaged with the tubular member 142 of the second end portion 14 and a groove 184 is defined in a periphery of an end of the second lead screw 18 such that a second fork member 19 is disposed to the second lead screw 18 by extending a bolt 196 through a stem of the second fork member 19 and being inserted in the groove 184. The other end of the second lead screw 18 has a knob 182 disposed thereto such that a user (not shown) can rotate the knob 182 to adjust the second lead screw 18. The second fork member 19 has a plurality of second spikes 192 extending longitudinally therefrom and facing to the first spikes 172.

Figure 4:
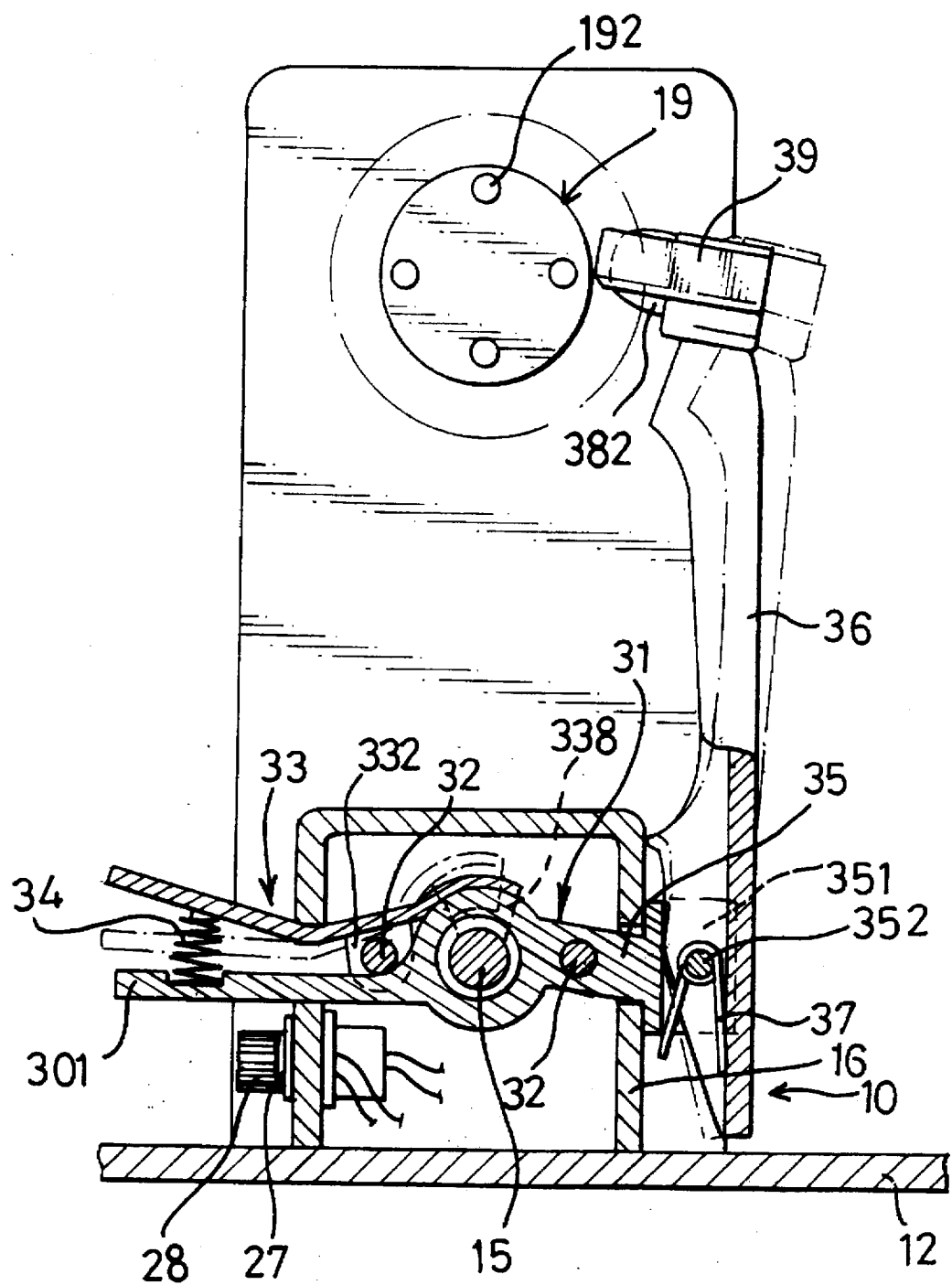
FIG. 4 is an end elevational view, partly in section, of the first lead screw and the knife of the peeling device.

Referring to FIG. 4, the movable member 31 has a first part 35 and a second part 301 respectively extending diametrically therefrom. The first part 35 has two lugs 351 extending separately therefrom such that a shank 36 of the knife 30 is pivotally connected between the two lugs 351 with a pin 352 extending through the shank 36 of the knife 30 and the two lugs 351. A first spring 37 is mounted to the pin 352 and urges the knife 30 toward an object 50 (see FIGS. 2 and 3) secured by the first fork member 17 and the second fork member 19.

Two guide rods 32 are connected between the first end portion 13 and the second end portion 14 and one of the two guide rods 32 extends through the first part 35 of the movable member 31.

A lever 33 is pivotally disposed to the other guide rod 32 and a stop 338 extends from the lever 33 so as to engage with the first lead screw 15 wherein two extending plates 332 extend downwardly from the lever 33 and the other guide rod 32 extends through the two extending plates 332. A second spring 34 is disposed between the lever 33 and the second part 301 of the movable member 31 such that the stop 338 is disengaged from the first lead screw 15 by pushing the lever 33 to press the second spring 34 so as to allow the movable member 31 together with the knife 30 to be moved along the first lead screw 15. The knife 30 has an arcuate blade 39 disposed to a top of the shank 36 and a block 382 extends from the shank 36 to define a gap between the block 382 and the arcuate blade 39 so as to prevent the blade 39 from cutting an object 50 (FIG. 2) too deep.

A frame 16 is mounted between the first end portion 13 and the second end portion 14 and the first lead screw 15 is received in the frame 16. The frame 16 has two slots 162 respectively defined in each one of two sides thereof such that the first part 301 and the second part 35 extend from the slots 162 respectively. Switches 27, 28 (see FIGS. 1 and 4) are disposed to the frame 16 and a limit switch 29 (FIG. 1) is disposed to an end of a stroke of the knife 30.

Accordingly, the object 50 can be securely disposed between the first fork member 17 and second fork member 19 by adjustably rotating the disk 182 to adapt a longitudinal length of the object 50. The stop 338 is disengaged from the first lead screw 15 by pushing the lever 33 until the movable member 31 is moved to one end of the object 50. The first lead screw 15 is then rotated by means of the second gear 24 driven by the motor 21 such that the movable member 31 is moved along the first lead screw 15 and the knife 30 peels the object 50 along an outer periphery of the object 50 until the limit switch 29 is touched by the shank 36 of the knife 30.

Although the invention has been explained in relation to its preferred embodiment, it is to be understood that many other possible modifications and variations can be made without departing from the spirit and scope of the invention as hereinafter claimed.

What is claimed is:
1. A peeling device comprising:
   a base having a top plate and a bottom plate, a first hole defined in said top plate near a first end of said base;
   a motor disposed in said base and located between said top plate and said bottom plate;
   said top plate having a first end portion disposed to a first end thereof and said first hole communicating with an interior of said first end portion, said top plate having a second end portion disposed to a second end thereof and located opposite to said first end portion;
   a transmitting means disposed in said first end portion and mechanically connected to said motor via said first hole;
   a first lead screw rotatably supported between said first end portion and said second end portion, one end of said first lead screw securely connected to said transmitting means;
   a movable member movably engaged with said first lead screw and a knife pivotally connected to said movable member, and
   a first fork member having one end thereof fixedly connected to said transmitting means and the other end thereof having a plurality of first spikes extending longitudinally therefrom, a second fork member movably extending from said second end portion with a plurality of second spikes extending from said second fork member facing to said first spikes.

2. The peeling device as claimed in claim 1 wherein said second end portion has a tubular member transversely disposed therethrough which has an inner threaded portion defined therein, a second lead screw threadedly engaged with said tubular member and said second fork member disposed to said second lead screw.

3. The peeling device as claimed in claim 1 wherein a said movable member has a first part and a second part respectively extending diametrically therefrom, said first part having two lugs extending separately therefrom such that a shank of said knife is pivotally connected between said two lugs with a pin extending through said shank of said knife and said two lugs, a first spring mounted to said pin and urging said knife toward an object secured by said first fork member and said second fork member.

4. The peeling device as claimed in claim 3 wherein two guide rods are connected between said first end portion and said second end portion with said first lead screw located between said two guide rods, one of said two guide rods extending through said first part.

5. The peeling device as claimed in claim 1 wherein a lever is slidably disposed to one of said guide rods with a second spring disposed between said lever and said second part of said movable member, a stop extending from said lever and engaged with said first lead screw wherein said stop is disengaged from said first lead screw by pushing said lever to press said second spring.

6. The peeling device as claimed in claim 1 wherein said knife has an arcuate blade disposed to said shank and a block extends from said shank to define a gap between said block and said arcuate blade.

* * * * *